N. G. SIMONDS & E. M. STEVENS.
APPARATUS FOR CURING MEAT UNDER PRESSURE.

No. 191,510. Patented May 29, 1877.

WITNESSES
Frank G. Parker
Thomas McAloon

INVENTORS
N. G. Simonds,
E. M. Stevens,
by J. H. Adams

UNITED STATES PATENT OFFICE.

NATHANIEL G. SIMONDS AND EDGAR M. STEVENS, OF BOSTON, MASS.

IMPROVEMENT IN APPARATUS FOR CURING MEAT UNDER PRESSURE.

Specification forming part of Letters Patent No. 191,510, dated May 29, 1877; application filed March 7, 1877.

*To all whom it may concern:*

Be it known that we, NATHANIEL G. SIMONDS and EDGAR M. STEVENS, of Boston, in the county of Suffolk and State of Massachusetts, have invented an Improved Apparatus for Curing Hams, Meats, &c., under Pressure, of which the following is a specification:

The object of our invention is to provide a simple and expeditious means for curing hams, meats, &c., and also for impregnating certain substances with any desired preservative liquid.

The invention consists in the combination of apparatus whereby hams, meats, or other substances to be cured or impregnated are subjected to the action of brine or other preservative liquid under pressure and *in vacuo*, and by a continuous process.

An exhaust apparatus is connected with the pressure-tank that contains the substance operated upon, by means of which the air in the tank, when the latter contains no liquid, is exhausted, and the preservative liquid is forced into the tank.

Figure 1:
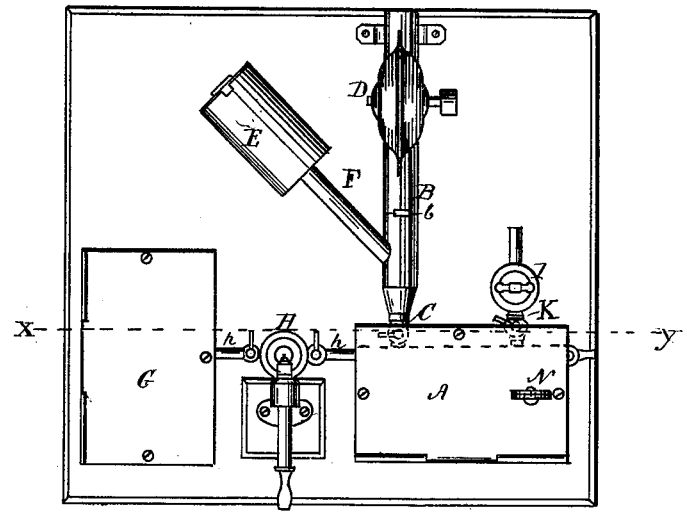
Figure 2:
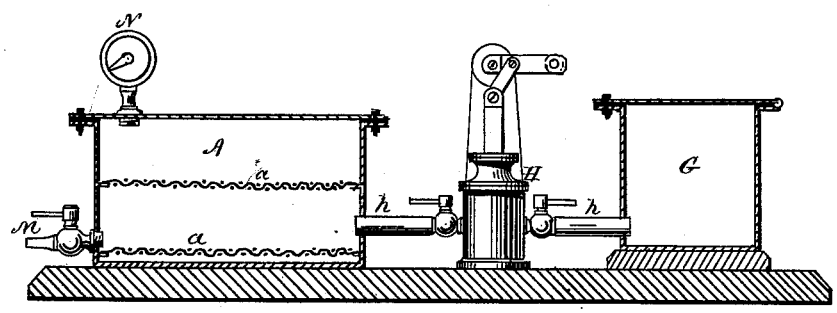

Referring to the drawings, Figure 1 represents a plan of an apparatus embodying our invention. Fig. 2 is a section of the same on the line $x\,y$ of Fig. 1.

A is a tank of any desired size or proportions, and constructed of metal or other material capable of sustaining any degree of pressure to which it may be subjected. The cover is to be tightly screwed to the body of the tank so that the joints will be air and water tight. Within the tank A are arranged horizontal grates $a$, one or more, for the support of the hams, meats, &c., to be operated upon. A waste-pipe, M, is provided for drawing off the liquid from the tank when necessary. A pressure gage, N, is also connected with the tank to indicate and regulate the degree of pressure exerted on the contents of the tank.

At a short distance from one end of the tank A is a tank, G, for containing the brine or liquid to be used in the curing-tank A, and between the two tanks is arranged a force-pump, H, connected with each tank by means of tubes provided each with a proper stop-cock. By means of this pump the brine or liquid in the tank G is forced into the tank A as required. At the side of the tank A is attached an exhaust-pump, I, by means of a suitable pipe, K, (seen in Fig. 1,) which is used to exhaust the air from the tank A before the liquid is to be injected, a vacuum being formed; and by opening the communication between the tanks A and G, in which latter the liquid is contained, it will flow into the tank A, and when it becomes full the force-pump will be applied and continue to force the liquid until the gage shows the maximum pressure shall have been obtained.

To one side of the tank A, at any suitable point, is connected a tube, B, provided with a stop-cock, C. The tube B communicates with a fan-blower, D, of any suitable construction, by means of which a strong current of air is forced through the tube B. Connected with the fan-blower tube B is a furnace, E, by means of a pipe, F, as shown in Fig. 1. The furnace E may be of any desired size or form best adapted for the generation of smoke suitable for the purposes intended.

When the fan-blower is operating in connection with the furnace, the escape-valve M is opened slightly to allow the air to be expelled from the tank A, the pump I is again used to exhaust the tank, and the smoke from the furnace will then be forcibly injected into the tank and impregnate its contents.

In the fan-blower tube B is a valve or cut-off, $b$. The object of this cut-off is to shut off the communication between the fan-blower and the furnace-flue, so that when the air is exhausted from the tank A, and communication opened with the furnace-flue by turning the cock C, the smoke will be drawn in to fill the vacuum in the tank A, and permeate the hams or meats contained therein.

What we claim as our invention is—

In the preservation of meat by the injection of brine under vacuum, the combination of apparatus consisting of the tanks A and G, connected by pipes and force-pump H, valves $h\,h$, exhaust-pump I, blower D, furnace E, pipes F and B, and valves $c$ and $b$, by which the meat can be preserved by one continuous process.

In testimony whereof we have signed our names to this specification in the presence of two subscribing witnesses.

NATHL. G. SIMONDS,
E. M. STEVENS.

Witnesses:
JOS. H. ADAMS,
THOMAS McALOON.